(12) United States Patent
Schmitt

(10) Patent No.: US 7,740,277 B2
(45) Date of Patent: Jun. 22, 2010

(54) MOTOR VEHICLE, IN PARTICULAR A CABRIOLET, HAVING A ROLLOVER PROTECTION DEVICE ARRANGE BEHIND THE SEATS

(75) Inventor: Hans-Jürgen Schmitt, Muehlacker (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 12/188,471

(22) Filed: Aug. 8, 2008

(65) Prior Publication Data
US 2009/0085376 A1 Apr. 2, 2009

(30) Foreign Application Priority Data
Sep. 28, 2007 (DE) .................. 10 2007 046 535

(51) Int. Cl.
*B60R 21/13* (2006.01)
(52) U.S. Cl. ..................................... 280/756
(58) Field of Classification Search ................. 280/756; 296/102, 107.3
See application file for complete search history.

(56) References Cited

U.S. PATENT DOCUMENTS

| 5,671,947 | A | | 9/1997 | Henn | |
| 7,338,076 | B2 | | 3/2008 | Hamamoto et al. | |
| 7,438,317 | B2 | * | 10/2008 | Rohner et al. | 280/756 |
| 7,540,535 | B2 | * | 6/2009 | Kasubke | 280/756 |
| 2006/0290124 | A1 | * | 12/2006 | Kasubke | 280/756 |
| 2006/0290125 | A1 | * | 12/2006 | Kasubke | 280/756 |
| 2006/0290126 | A1 | * | 12/2006 | Kohlem et al. | 280/756 |
| 2008/0122210 | A1 | * | 5/2008 | Liesaus et al. | 280/756 |
| 2008/0197613 | A1 | * | 8/2008 | Latussek | 280/756 |
| 2009/0020994 | A1 | * | 1/2009 | Liesaus | 280/756 |

FOREIGN PATENT DOCUMENTS

| EP | 0 722 859 B1 | 7/1996 |
| EP | 1 582 421 A2 | 10/2005 |

* cited by examiner

*Primary Examiner*—Faye M. Fleming

(57) ABSTRACT

A motor vehicle, in particular cabriolet, has a rollover protection device disposed behind the seats. The rollover protection device has a supporting frame, which extends in a vehicle transverse direction and which is fastened to the adjoining vehicle supporting structure, and at least one rollover protection cassette which contains a deployable rollover body. The supporting frame contains lateral upright column sections, a transversely running connecting profile and support elements which are connected to the column sections. Here, it is important that the at least one rollover protection cassette or a housing thereof is a constituent supporting part of the multipart supporting frame which extends in the vehicle transverse direction.

16 Claims, 7 Drawing Sheets

MOTOR VEHICLE, IN PARTICULAR A CABRIOLET, HAVING A ROLLOVER PROTECTION DEVICE ARRANGE BEHIND THE SEATS

CROSS-REFERENCE TO RELATED APPLICATION

This application claims the priority, under 35 U.S.C. §119, of German application DE 10 2007 046 535.3, filed Sep. 28, 2007; the prior application is herewith incorporated by reference in its entirety.

BACKGROUND OF THE INVENTION

Field of the Invention

The invention relates to a motor vehicle, in particular a cabriolet, having a rollover protection device disposed behind the seats. The rollover protection device has a supporting frame, which extends in a vehicle transverse direction and which is fastened to the adjoining vehicle supporting structure, and at least one rollover protection cassette which contains a deployable rollover body. The supporting frame has lateral upright column sections, a transversely running connecting profile and support elements which are connected to the column sections.

European patent EP 0 722 859 B1, corresponding to U.S. Pat. No. 5,671,947 A, discloses a generic rollover protection device which contains at least one pre-manufactured rollover protection cassette, which contains a protective bar and an actuator, and a rollover sensor. Here, the rollover protection cassette, together with the protective bar and the actuator and a rollover sensor, is fastened outside the motor vehicle to a supporting frame which forms the receptacle, and forms a pre-cabled, functional module which can be tested outside the vehicle and subsequently fixed to the vehicle body. Here, the rollover protection cassette is arranged in front of the supporting frame and is connected to the latter in this position. In order to be able to obtain the stiffness required for the cabriolet, the supporting frame must have a certain profile thickness, as a result of which the rollover protection cassette together with the supporting frame requires a not inconsiderable amount of installation space in the vehicle longitudinal direction.

Published, non-prosecuted European patent application EP 1 582 421 A2, corresponding to U.S. Pat. No. 7,338,076 B2, discloses a further rollover protection device in which fixed, that is to say non-deployable rollover bars are arranged on a carrier which runs in the vehicle transverse direction. Here, the rollover protection device is connected in each case at the longitudinal end sides to corresponding vehicle-mounted brackets by screws.

SUMMARY OF THE INVENTION

It is accordingly an object of the invention to provide a motor vehicle, in particular a cabriolet, having a rollover protection device disposed behind the seats that overcomes the above-mentioned disadvantages of the prior art devices of this general type, which is distinguished in particular by a reduced installation space requirement.

With the foregoing and other objects in view there is provided, in accordance with the invention, a motor vehicle. The motor vehicle contains seats, a vehicle supporting structure, and a rollover protection device disposed behind the seats. The rollover protection device contains a supporting frame extending in a vehicle transverse direction and fastened to the vehicle supporting structure. The supporting frame has two lateral upright column sections, a transversely running connecting profile, and two support elements connected to the lateral upright column sections. The rollover protection device further has at least one rollover protection cassette having a deployable rollover body and a housing. The at least one rollover protection cassette and/or the housing is a constituent part of the supporting frame.

The invention is based on the general concept of integrating the rollover protection device, or at least a component thereof, that is to say a rollover protection cassette, as a supporting constituent part into a supporting frame which extends in the vehicle transverse direction. Here, the rollover protection device according to the invention has at least one, preferably two rollover protection cassettes which contain in each case one rollover body and which form a constituent part of the multi-part stiffening beam. The rollover protection cassette is therefore not screwed or welded to an already-existing supporting frame which extends in the vehicle transverse direction, as in the prior art, but rather forms an integral constituent part of such a supporting frame which extends in the transverse direction. This offers the particular advantage that the installation space required by the rollover protection device according to the invention can be considerably reduced, in particular in the vehicle longitudinal direction, since the rollover protection cassette and the supporting frame are not, like before, arranged one behind the other in the direction of travel, and a considerable weight (and cost) saving can be made at the same time.

In a further advantageous embodiment of the solution according to the invention, the rollover protection device contains at least the following components: two rollover protection cassettes, a connecting profile which extends in the vehicle transverse direction and which is arranged between the two rollover protection cassettes, two lateral upright column sections which are connected in each case to the outer ends of the rollover protection cassettes, and two support elements, by which the two column sections of the supporting frame are connected to a vehicle supporting structure.

In the vehicle transverse direction, the rollover protection device according to the invention is therefore constructed as follows: the left-hand upright column section is adjoined by the left-hand rollover protection cassette, with the transversely-running connecting profile being connected to that side of the rollover protection cassette which faces away from the left-hand column section. The connecting profile is now adjoined by the right-hand rollover protection cassette and the right-hand upright column section. In each case one support element leads away from the two column sections, which support element can be aligned forward or rearward.

In the present case, the rollover protection device according to the invention is therefore of mirror-symmetrical design. Here, it is of course also conceivable for individual components, such as for example the support elements or the connecting profile which is arranged between the two rollover protection cassettes, to be matched to a wide variety of vehicle variants, while for example the two rollover protection cassettes are used as a standard for all cabriolet versions.

According to a first embodiment, the two support elements extend rearward from the rear side of the two upright column sections. The tubular or hollow-beam-like support elements are connected in each case by detachable fastening elements (fastening screws) at one side to a retaining angle bracket which is provided on the column sections and at the other side to rear longitudinal beams of the vehicle supporting structure. In an alternative embodiment, the support elements extend forward from the outer end side of the two upright column sections. The tubular or hollow-beam-like support elements are connected by detachable fastening elements (fastening screws) at one side to lateral brackets of the column sections and at the other side to lateral outer sections, which are situated further forward, of the vehicle supporting structure. The support elements can also be welded. By pre-assembling the supporting frame and support elements, it is possible to obtain very good tolerance specification of the supporting frame (large support base).

In one advantageous refinement of the solution according to the invention, the rollover protection device has at least one plate-shaped stiffening element, by which the rollover protection element is supported in the rearward vehicle longitudinal direction, in particular against a folding-top storage compartment. In this way, it is possible to obtain additional stiffening of the supporting frame which is formed by the rollover protection device and which extends in the vehicle transverse direction, and also to obtain a reduction in vehicle twist, in particular in connection with support in the forward direction. To further increase the stiffening action, the plate-shaped stiffening element can for example have stiffening ribs which are aligned corresponding to a previously calculated loading profile. The plates can serve to hold assemblies.

It is self-evident that the features specified above and those yet to be explained below can be used not only in the respectively specified combination but also in other combinations or individually without departing from the scope of the present invention.

Other features which are considered as characteristic for the invention are set forth in the appended claims.

Although the invention is illustrated and described herein as embodied in a motor vehicle, in particular a cabriolet, having a rollover protection device disposed behind the seats, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
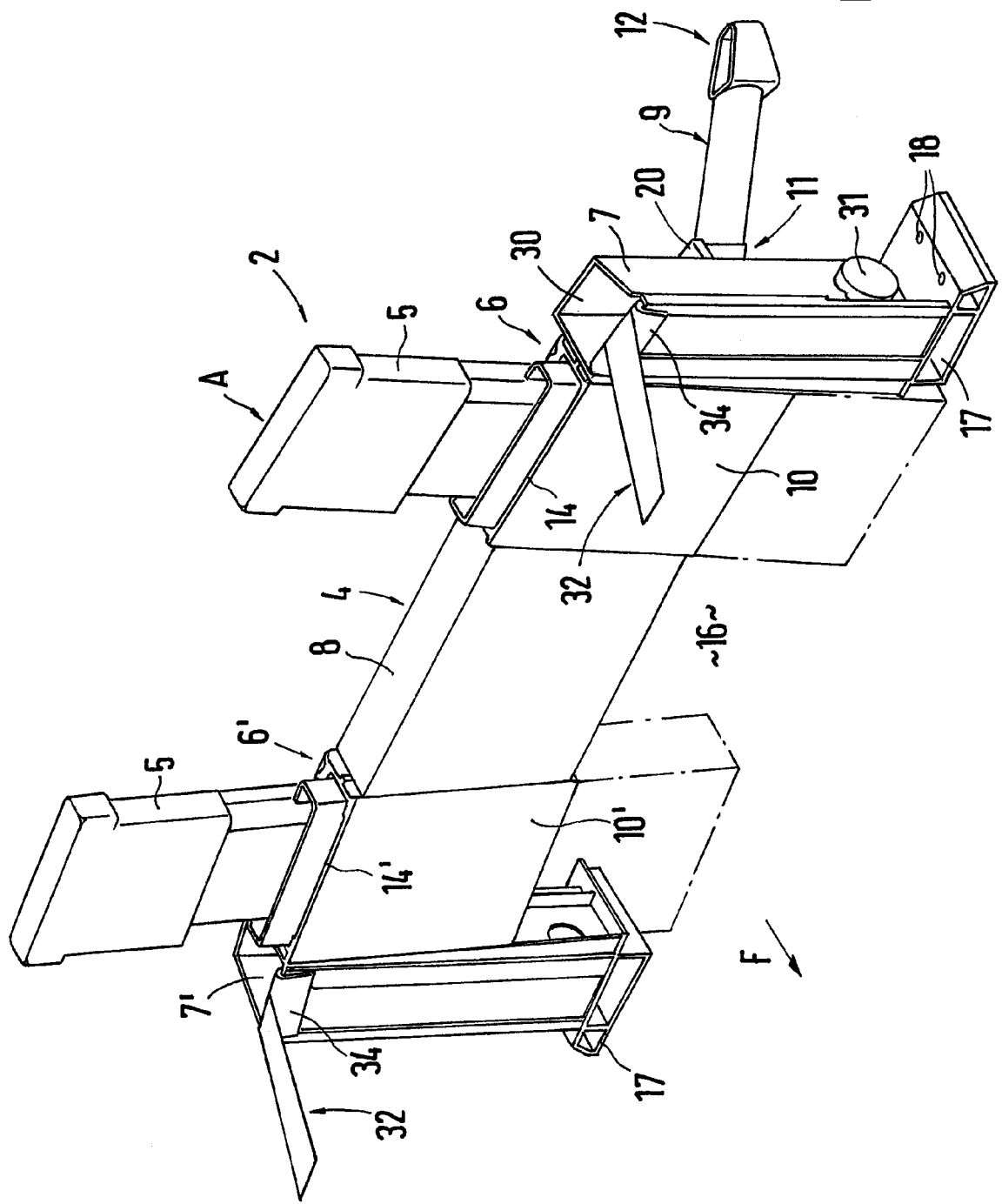
FIG. 1 is a diagrammatic, front, perspective view of a first embodiment of a rollover protection device according to the invention.
Figure 2:
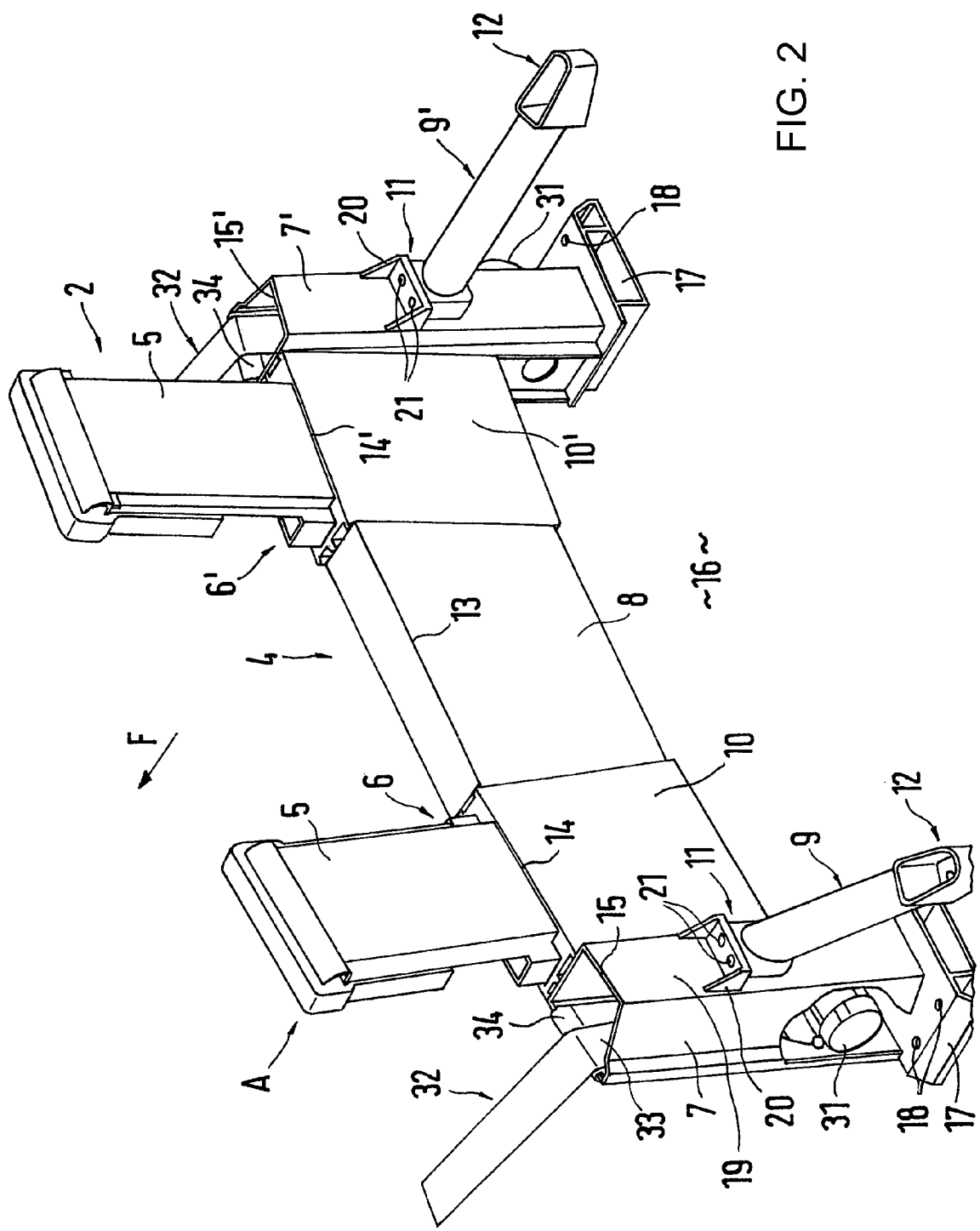
FIG. 2 is a rear, perspective view of the first embodiment of the rollover protection device.
Figure 3:
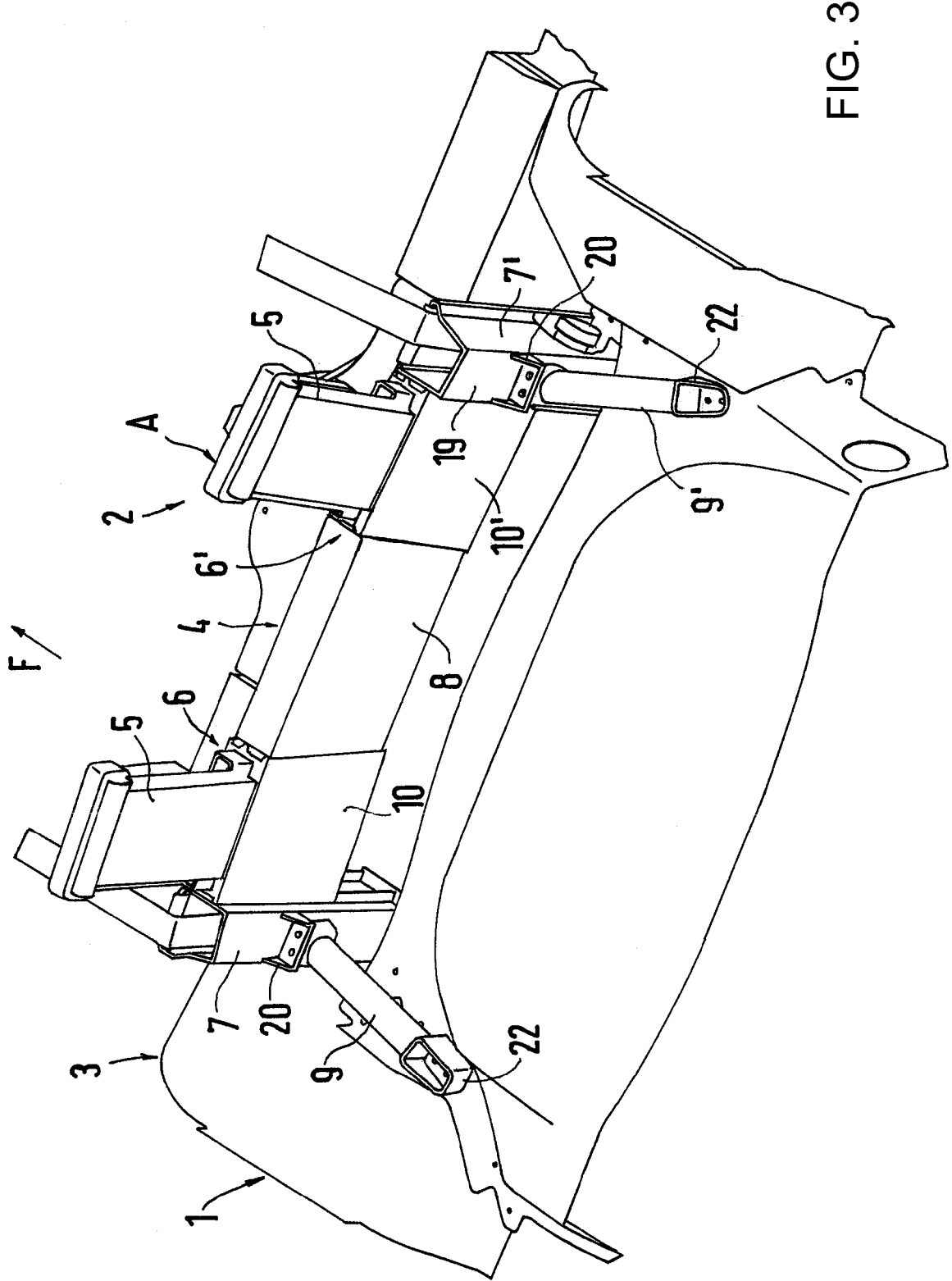
FIG. 3 is a perspective partial view from the rear of the first embodiment of the rollover protection device in a state in which it is installed in a motor vehicle.

Referring now to the figures of the drawing in detail and first, particularly, to FIGS. 1-3 thereof, there is shown a motor vehicle 1 which is embodied as a cabriolet (convertible) and has a rollover protection device 2 in a region behind non-illustrated vehicle seats. Here, the rollover protection device 2 is triggered by a non-illustrated sensor if a movement takes place which triggers a rollover of the motor vehicle 1.

The rollover protection device 2 has a supporting frame 4, which extends in a vehicle transverse direction and which is fastened to an adjoining vehicle supporting structure 3 (see FIG. 3), and at least one rollover protection cassette 6, 6' which contains a deployable rollover body 5. The supporting frame 4 substantially contains lateral upright column sections 7, 7', a transversely running hollow-beam-like connecting profile 8 and two support elements 9, 9' which are connected to the column sections 7, 7'. Each pre-manufactured rollover protection cassette 6, 6' typically has the rollover body 5 which is guided in a deployable and retractable fashion in a housing 10 which is fixed to the vehicle, which rollover body 5 can be quickly deployed into an upper position A in a sensor-controlled fashion in the event of danger. In order to mechanically hold the deployed rollover body 5 in the position against external forces acting on it, a locking device (not illustrated in any more detail) for the rollover body 5 is provided. In all of the figures, the rollover body 5 is in its deployed position A, whereas the retracted rest position of the rollover body 5 is not illustrated.

According to the invention, at least one rollover protection cassette 6, 6', and if the motor vehicle 1 has two rollover protection cassettes 6, 6', both of these, or a housing thereof, is formed as a supporting constituent part of the multi-part supporting frame 4 which extends in the vehicle transverse direction. This offers the advantage that the two rollover protection cassettes 6, 6' need not be arranged in front of or behind a transverse beam in the direction of travel, which would lead to an increased installation space requirement in the vehicle longitudinal direction.

Viewing the first embodiment illustrated in FIGS. 1 to 3, it is possible to see that the rollover protection device 2 is composed of two rollover protection cassettes 6, 6', a connecting profile 8 which extends in the vehicle transverse direction and which is disposed between the two rollover protection cassettes 6, 6', and the two upright column sections 7, 7' disposed laterally at the outside. Furthermore, an end 11 of a support element 9, 9' is connected to each laterally outer column section 7, 7'. The other end 12 of the support element 9, 9' is connected to the adjoining vehicle supporting structure 3.

In the vehicle transverse direction, the rollover protection device 2 according to the invention is therefore constructed as follows: the left-hand upright column section 7' is adjoined by the left-hand rollover protection cassette 6', with the transversely-running connecting profile 8 being connected to that side of the rollover protection cassette 6' which faces away from the left-hand column section 7'. The connecting profile 8 is now adjoined by the right-hand rollover protection cassette 6 and the right-hand upright column section 7. In each case one support element 9, 9' leads away from the two column sections 7, 7', which support element can in principle be aligned forward or rearward.

The individual components of the rollover protection device 2 can for example be welded, adhesively bonded, screwed or riveted to one another, or a combination of these. The components of the rollover protection device 2 are preferably formed from metal, in particular from light metal or from cast metal in order first to be able to provide the required stiffness, and second to keep the weight of the rollover protection device 2 according to the invention as low as possible. Also conceivable is a fiber-reinforced or metal-reinforced plastic variant.

It is generally conceivable for at least individual components of the rollover protection device 2 such as the transversely-running connecting profile 8 or the two lateral upright column sections 7, 7' or at least the outer housings 10, 10' of the rollover protection cassettes 6, 6' to be formed by extruded profile parts from a light metal alloy. An upper edge region 14, 14' of the two housings 10, 10' of the rollover protection cassettes 6, 6' runs at approximately the same height as the upper edge 15 of the two column sections 7, 7' and an upper edge 13 of the connecting profile 8. The two rollover protection cassettes 6, 6' extend approximately in the vertical direction and run either parallel to a vertical secondary plane B-B or else are slightly inclined with respect to the secondary plane B-B. The two housings 10, 10' of the rollover protection cassettes 6, 6' and the transversely running connecting profile 8 have a considerably smaller height extent than the adjoining column sections 7, 7', such that, between the two column sections 7, 7' which run with a spacing to one another, a free space 16 remains between the lower edge of the housing 10, 10' or of the connecting profile 8 and the underlying vehicle supporting structure 3. The two housings 10, 10' can alternatively extend as far as the underlying vehicle supporting structure 3 (see dotted lines in FIG. 1).

The two lower ends of the column sections 7, 7' are connected to the underlying vehicle supporting structure 3 with the interposition of supporting feet 17. The two supporting feet 17 can likewise be formed by extruded profile parts. The supporting feet 17 are preferably welded to the lower end of the column sections 7, 7' and have openings 18 for leading through fastening screws (not shown in any more detail). In the first embodiment, the two column sections 7, 7' are connected to the vehicle supporting structure 3 in each case by a rearwardly aligned support element 9, 9'. For the detachable fastening of the support elements 9, 9', retaining angle brackets 20 are welded to a rear side 19 of the upright column sections 7, 7', which retaining angle brackets 20 likewise have openings 21 for leading through fastening screws. The retaining angle brackets 20 are disposed approximately in a middle region of the height extent of the upright column sections 7, 7', or slightly higher. The fastening screws extend in a vehicle height direction (Z direction). The rearwardly aligned support elements 9, 9' are formed in the exemplary embodiment by rectilinear tube sections which are provided at the end side in each case with fastening sections for the screw fastenings. The support elements 9, 9' can also be formed by profiled carriers, stiffened cast parts or a plated tube. The support elements 9, 9' run from the front inside to the rear outside as seen in plan view. The support elements 9, 9' can be aligned either horizontally or obliquely as viewed from the side. The slightly lower rear end of the two support elements 9, 9' is, in the exemplary embodiment, placed onto and detachably connected to a rear longitudinal beam 22 of the vehicle structure 3.

The rollover protection device 2 which extends over a significant part of the vehicle inner width is connected by the two supporting feet 17 of the column sections 7, 7' to the vehicle supporting structure 3, in particular to a seat depression or a vehicle transverse beam, thereby providing additional stiffening of the body. The two column sections 7, 7' with the lower supporting feet 17 and the welded-on retaining angle brackets 20, the two rollover protection cassettes 6, 6' and the transversely-running connecting profile 8 form a pre-manufactured structural unit which is connected by detachable fastening elements to the vehicle supporting structure 3 and the two lateral supporting elements 9, 9'. The direction of travel of the vehicle is denoted in all the figures by the arrow F.

Figure 4:
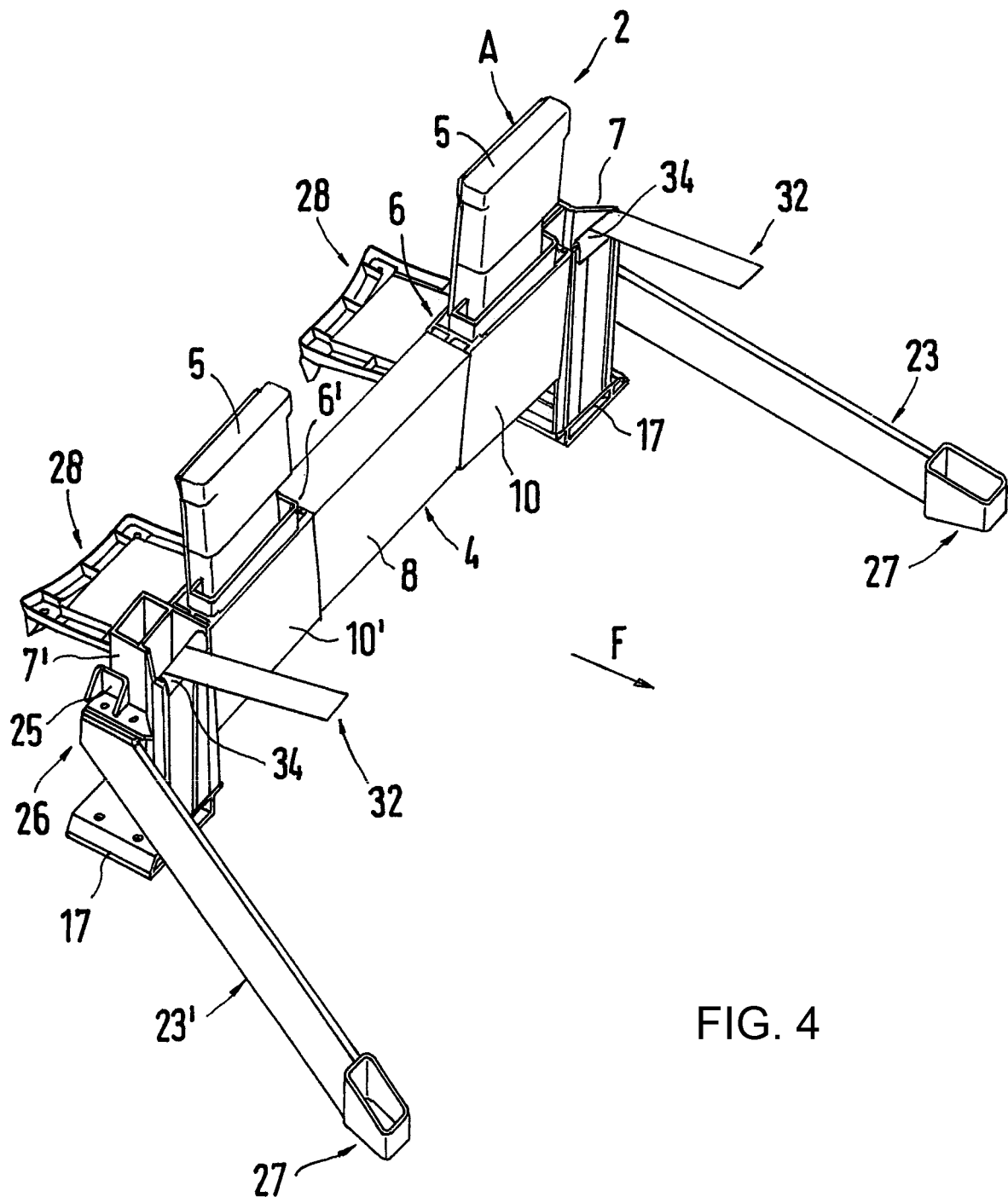
FIG. 4 is a diagrammatic, perspective view obliquely from the front of a second embodiment of a rollover protection device according to the invention.
Figure 5:
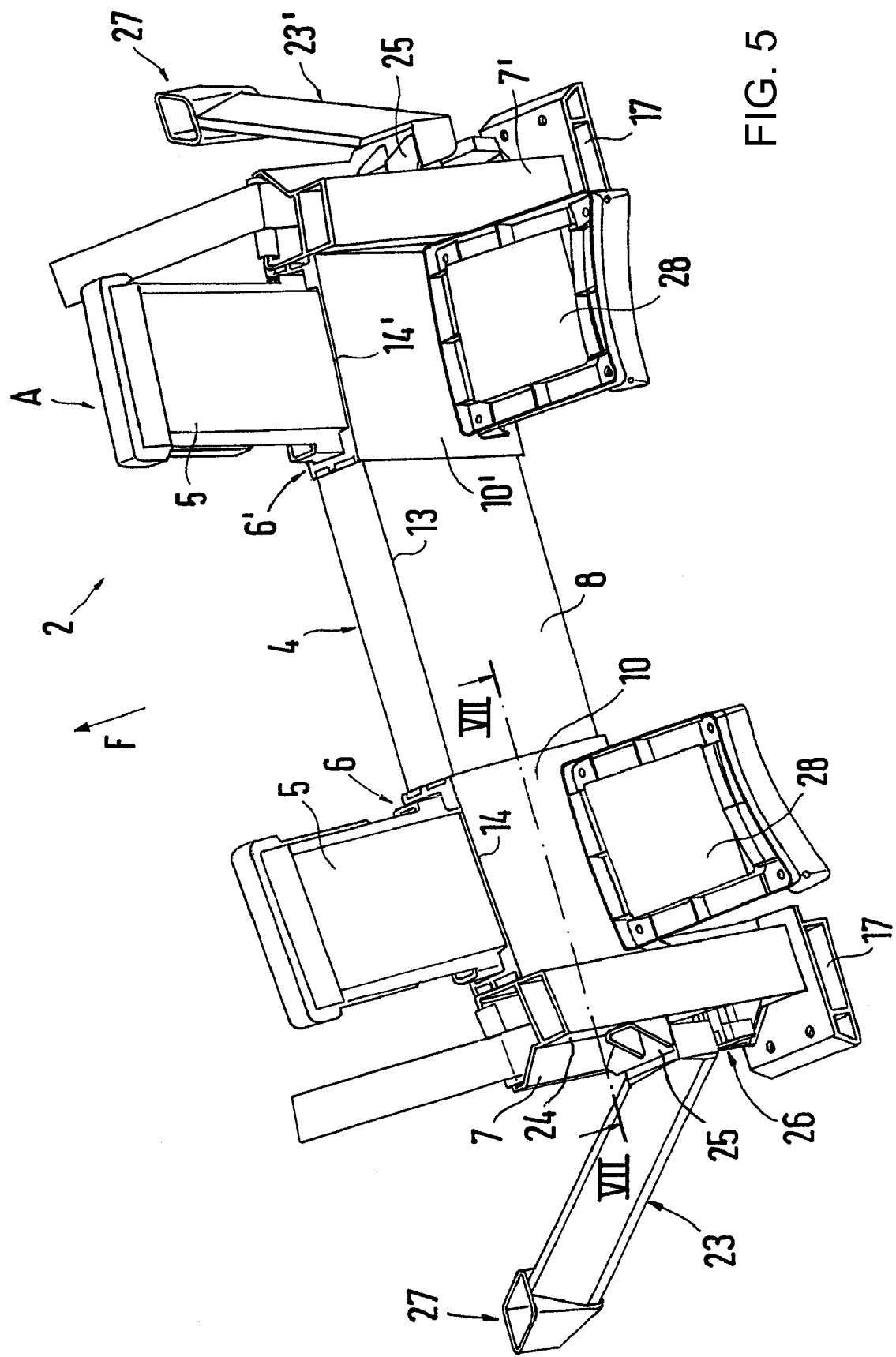
FIG. 5 is a rear, perspective view of the second embodiment of the rollover protection device.
Figure 6:
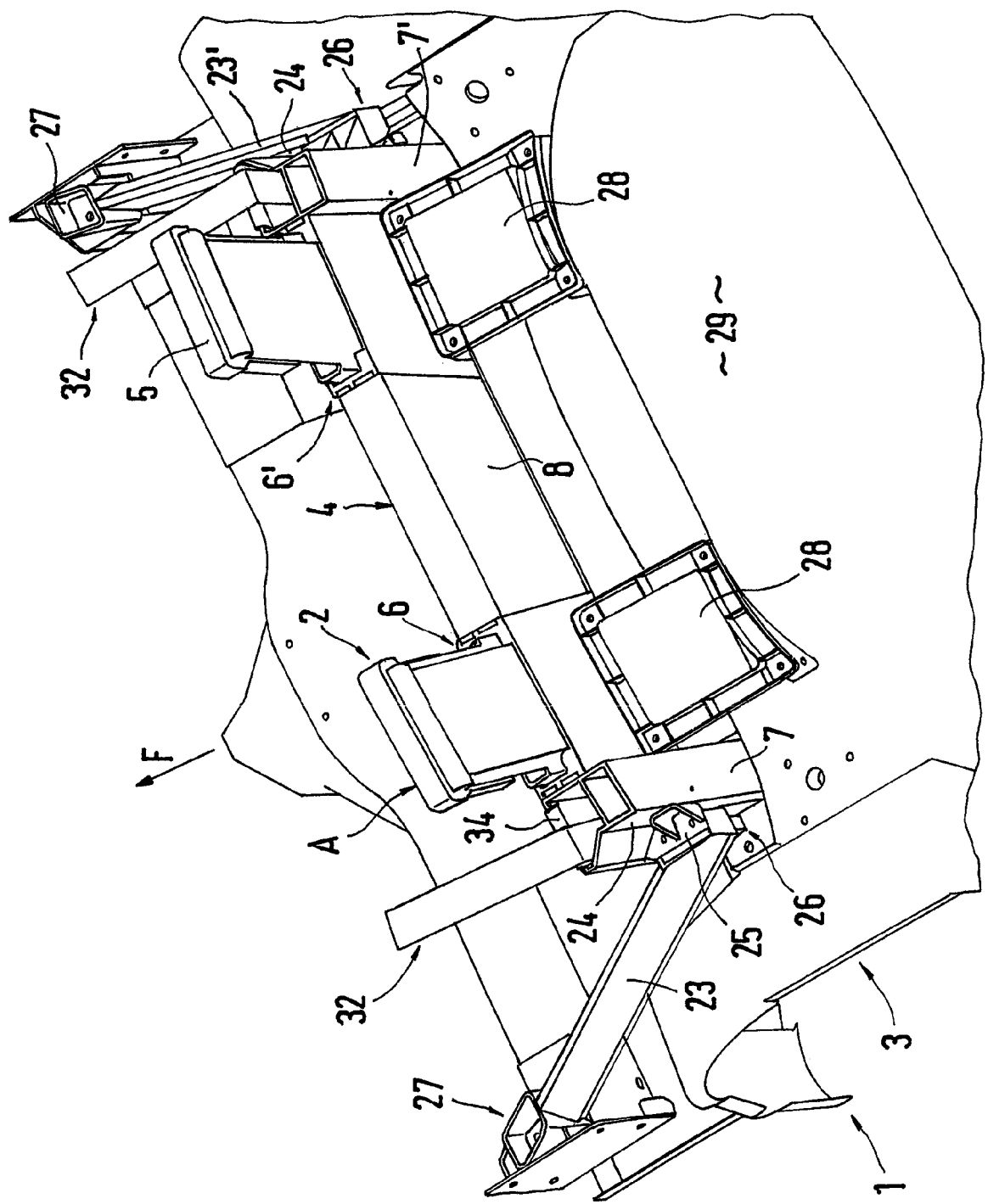
FIG. 6 is a perspective partial view obliquely from the rear of the second embodiment of the rollover protection device in a state in which it is installed in a motor vehicle.

The second embodiment of the rollover protection device 2 according to the invention differs from the first embodiment primarily in the configuration of the lateral support elements 23, 23'. In the second embodiment, the supporting frame 4 of the rollover protection device 2 is connected to the vehicle supporting structure 2 by the forwardly aligned support elements 23, 23'. In each case one bracket 25 is welded to the laterally outer upright outer sides 24 of the two column sections 7, 7', to which bracket 25 a rear end 26 of the forwardly aligned support element 23, 23' can be fastened by upright fastening screws. A front end 27 of the support element 23, 23' which runs obliquely forwards and outwards is connected to a vehicle seat region. This can be the B-pillar, a side wall, a folding-top mount or a component of a side impact protection device. In contrast to the rollover protection device 2 as per FIGS. 1 to 3, the rollover protection device 2 as per FIGS. 4 to 6 additionally has at least one rearwardly projecting plate-shaped stiffening element 28, by which the rollover protection device 2 is supported in the rearward direction in the vehicle longitudinal direction, in particular against the base of a folding-top storage compartment 29. In contrast to the rollover protection device known from the prior art, the rollover protection device 2 according to the invention has a considerably reduced installation space requirement in the vehicle longitudinal direction, since the rollover protection cassettes 6, 6' and the connecting profile 8 are not disposed in parallel in the vehicle transverse direction in front of or behind a transverse beam, but replace the latter.

In both embodiments, the laterally outer upright column sections 7, 7' hold, within their cavity 30, specifically in a lower end region, in each case one belt roller 31 of a safety belt system 32. A belt web 33 is guided upward within the cavity 30 and is deflected by a fitted deflecting element 34.

Figure 7:
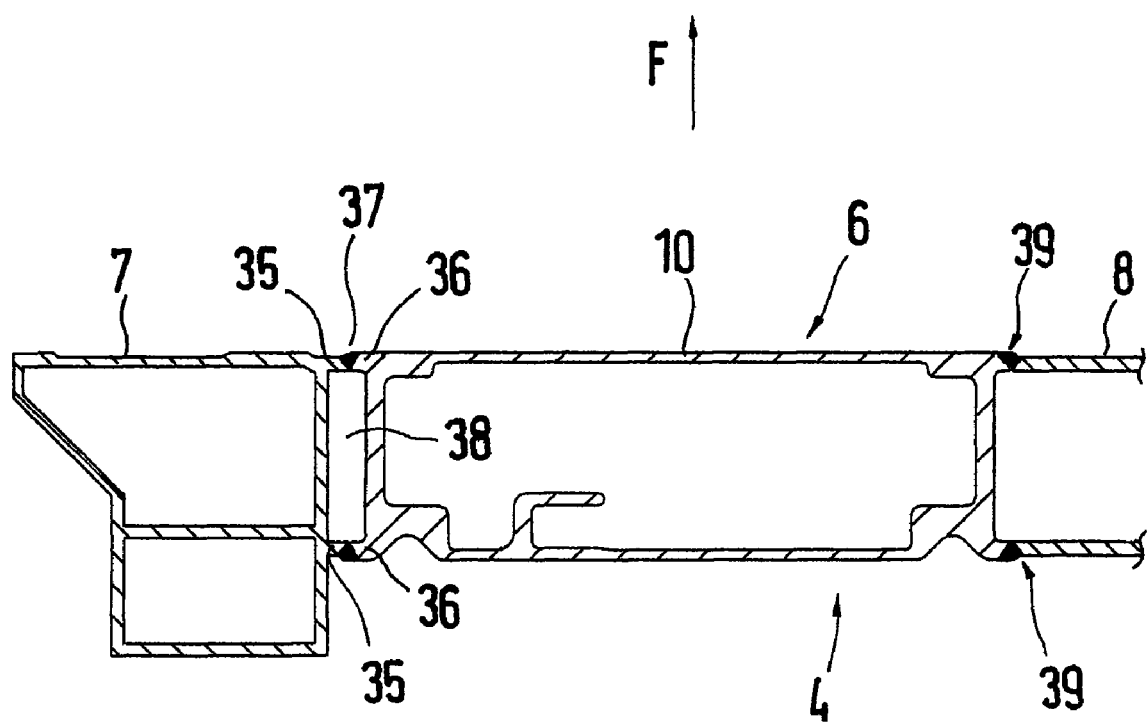
FIG. 7 is an enlarged sectional view taken along the line VII-VII shown in FIG. 5.

FIG. 7 illustrates a possible connection of the column section 7, 7' to the adjoining housing 10, 10' of the pre-manufactured rollover protection cassette 6, 6'.

In the arrangement, both the column sections 7, 7' and also the housings 10, 10' are provided with in each case two laterally projecting vertical flanges 35, 36 which face toward one another and which are welded to one another in each case in a common connecting region at 37. By welding the flanges 35, 36, an additional stiffening hollow chamber 38 is generated at the outside adjacent to the rollover protection cassette 6, 6'. The housing 10, 10' and the connecting profile 8 are likewise welded to one another at 39.

Furthermore, it is also possible for additional assemblies to be fastened to the supporting frame 4 and to therefore be pre-mounted outside the vehicle. In the exemplary embodiment, control units for the Motronic, Tiptronic, the folding top, components of the central electrics and hydraulic and/or electric assemblies of the folding-top drive can be fixed to the supporting frame 4. Furthermore, the supporting frame 4 supports an overhead, transversely-running, approximately horizontally aligned lining which laterally adjoins the two rear side linings. Backrest locking arrangements and/or backrest mounts for the backrests of the vehicle seats can also be provided on the rollover protection device 2 or on the supporting frame 4. It is also conceivable for an upper retaining strap of a child seat to be detachably fastened to the rollover protection device 2.

The invention claimed is:

1. A motor vehicle, comprising:
   seats;
   a vehicle supporting structure;
   a rollover protection device disposed behind said seats, said rollover protection device containing:
      a supporting frame extending in a vehicle transverse direction and fastened to said vehicle supporting structure, said supporting frame having two lateral upright column sections, a transversely running connecting profile, and two support elements connected to said lateral upright column sections; and
      at least one rollover protection cassette having a deployable rollover body and a housing, at least one of said at least one rollover protection cassette and said housing being a constituent part of said supporting frame, said rollover protection cassette is disposed externally adjacent to said lateral upright column sections.

2. The motor vehicle according to claim 1, wherein:
   said rollover protection cassette is one of two rollover protection cassettes having outer ends;
   said connecting profile extending in said vehicle transverse direction is disposed between said two rollover protection cassettes;
   said two lateral upright column sections are connected in each case to one of said outer ends of said rollover protection cassettes; and
   said two support elements connect said two lateral upright column sections to said vehicle supporting structure.

3. The motor vehicle according to claim 2, wherein components of said rollover protection device are one of welded, screwed and riveted to one another.

4. The motor vehicle according to claim 2, wherein components of said rollover protection device are formed from one of metal, a light metal, a cast metal and fiber-reinforced plastics.

5. The motor vehicle according to claim 2, wherein at least one of said connecting profile, said two lateral upright column sections, and said housings of said rollover protection cassettes are formed from extruded profile parts.

6. The motor vehicle according to claim 2, wherein:
   said two lateral upright column sections each have an upper edge; and
   said housings have an upper edge region approximately aligned with said upper edge of said two lateral upright column sections adjoining said housings, said housings and said connecting profile have a lower height extent than said lateral upright column sections such that a free space remains between a lower edge of one of said housings and of said connecting profile and said vehicle supporting structure.

7. The motor vehicle according to claim 1, wherein said two lateral upright column sections have lower ends with supporting feet detachably connected to said underlying vehicle supporting structure with an interposition of said supporting feet.

8. The motor vehicle according to claim 1, wherein said two lateral upright column sections are connected to said vehicle supporting structure in each case by said support elements being rearwardly aligned support elements.

9. The motor vehicle according to claim 8, further comprising a retaining angle bracket welded to a rear side of said two lateral upright column sections in each case and approximately in a middle to upper region of a height extent of said two lateral upright column sections, to which said retaining angle bracket can be fastened a front end of said rearwardly aligned supporting elements.

10. The motor vehicle according to claim 1, wherein:
    said vehicle supporting structure has a rear longitudinal beam; and
    said support elements each being a rearwardly aligned support element having a rear end detachably fastened to said rear longitudinal beam of said vehicle supporting structure.

11. The motor vehicle according to claim 1, wherein said two support elements are forwardly aligned support elements, said two lateral column sections of said rollover protection device are connected to said vehicle supporting structure in each case by one of said forwardly aligned support elements.

12. The motor vehicle according to claim 11, further comprising in each case one lateral retainer attached to upright outer sides of said two lateral upright two column sections, to which said lateral retainer is detachably fastened a rear end of one of said forwardly aligned support elements.

13. The motor vehicle according to claim 11, further comprising a side impact protection device, a front end of each of said forwardly aligned support elements is detachably connected to a component of said side impact protection device.

14. The motor vehicle according to claim 11, further comprising in each case one lateral retainer attached to upright outer sides of said two lateral upright two column sections, to which said lateral retainer is detachably fastened a rear end of one of said rearwardly aligned support elements.

15. The motor vehicle according to claim 1, wherein the motor vehicle is a cabriolet.

16. A rollover protection device disposed behind seats of a motor vehicle, said motor vehicle further having a vehicle supporting structure, the rollover protection device comprising:
    a supporting frame extending in a vehicle transverse direction and fastened to the vehicle supporting structure, said supporting frame having two lateral upright column sections directly connected to the vehicle supporting structure, a transversely running connecting profile, and two support elements connected to said lateral upright column sections; and
    at least one rollover protection cassette having a deployable rollover body and a housing, at least one of said at least one rollover protection cassette and said housing being a constituent part of said supporting frame, said rollover protection cassette is disposed externally adjacent to said lateral upright column sections.

* * * * *

UNITED STATES PATENT AND TRADEMARK OFFICE
Certificate

Patent No. 7,740,277 B2                                                          Patented: June 22, 2010

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Hans-Jürgen Schmitt, Muehlacker (DE); Josip Vlahovic, Freiberg am Neckar (DE); Felix Hermann, Leonberg (DE); and Dominik Beierl, Korntal-Muenchingen (DE).

Signed and Sealed this Eleventh Day of March 2014.

<div style="text-align:right">

PAUL N. DICKSON
*Supervisory Patent Examiner*
Art Unit 3616
Technology Center 3600

</div>